United States Patent Office 3,429,824
Patented Feb. 25, 1969

3,429,824
COMPOSITION AND METHOD FOR TREATING SCALE
Jack F. Tate, Houston, Tex., assignor to Texaco Inc., New York, N.Y., a corporation of Delaware
No Drawing. Filed June 24, 1966, Ser. No. 560,117
U.S. Cl. 252—180
Int. Cl. C07f 9/08; C02b 5/06
11 Claims This invention relates to a composition useful in treating oil and gas wells and to a method of using such composition for such treatment. More particularly, this invention is directed to a composition and method useful in the prevention and/or inhibition of the build-up of undesirable scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to scale formation.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore results in the precipitation of a hard crystalline calcium sulfate deposit which gradually builds up on the walls of the well tubing, for example, to a point where it would choke off fluid flow in the tube if remedial measures were not undertaken.

Another cause of the scale formation is attributed to the precipitation of scale material from supersaturated salt solutions containing the same. When such solutions pass from strata wherein temperatures and pressures are relatively high into the relatively low temperature and pressure area at or about the well bore, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This deposit of precipitate may then be removed by suitable mechanical means. Such a method is obviously undesirable in that considerable periods of time are involved and the use of mechanical apparatus is expensive, and in some cases, either undesirable of mechanically impossible. Moreover, strong alkali is not effective in preventing or inhibiting the build-up of scale deposits in well tubing, production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising a phosphate ester having the general formula

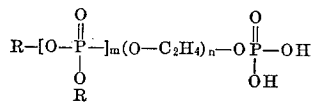

wherein R is either hydrogen or a $$C_{13}H_{27}O—(C_2H_4O)_{n-1}—C_2H_4$$

group in which $n$ is 1 to 3, $m$ is equal to 2 or 3, and R is a hydrogen atom not more than $m$ minus one times, or a mixture of said esters, said ester having a molecular weight in the range of from about 750 to about 1730, said treating composition being employed in an amount sufficient to inhibit the development of scale in an aqueous system.

The invention also comprises a method of treating equipment susceptible to the development of scale deposits therein such as water storage tanks and the like, particularly oil field equipment, using the scale prevention composition.

The phosphate esters of the present invention can be prepared in a known manner such as for example by ethoxylation of tridecanol and subsequent phosphorylation of the ethoxylated tridecanol.

The corresponding salts of the ester can be prepared by neutralization of the ester with caustic or potassium or ammonium hydroxide.

A preferred ester is an ester having the structural formula

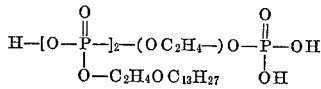

having a molecular weight of 754 and the empirical formula $C_{32}H_{69}O_{13}P_3$, or a mixture of said ester with an ester having the structural formula

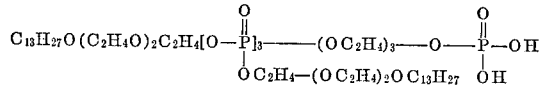

which has the empirical formula $$C_{82}H_{170}O_{28}P_4$$

The admixture of esters may contain from about 30 to 70% by weight of the $C_{32}H_{69}O_{13}P_3$ ester and about 70 to 30% by weight of the $C_{82}H_{170}O_{28}P_4$ ester. A preferred range is about 40 to 60% of the $C_{32}$ ester and about 60 to 40% of the $C_{82}$ ester.

In carrying out one aspect of the present invention the method thereof comprises introducing the scale prevention composition into the equipment to be protected, such as oil well tubing, in the form of an aqueous solution in an amount sufficient to provide the phosphate ester therein at a concentration of from about 0.0005 to about 0.01% by weight and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e., by passing the solution into said strata such as by injection of the solution down through the bore hole or production tubing, preferably under pressure.

In general, it has been found that excellent protection against objectionable scale deposits can be obtained by maintaining the treating composition in contact with the scale for a contacting time period of from about 2 to about 24 hours and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention i.e. on a semiweekly or weekly basis, then shorter contacting times (e.g. averaging about 4 to 10–12 hrs.) can be used. Less frequent treating intervals, i.e. at about every 10 or 15 days generally necessitate corresponding longer contacting times that may average between 12 and 24 hrs.

The scale prevention composition of the present invention is used in an amount sufficient to provide to the treating solution the phosphate ester in an amount of from 0.0005% to 0.01% by weight and preferably the solution should have a pH of at least about 7.0. It has been found that excellent results are obtained with the phosphate ester at concentrations in the range of from about 0.001% to about 0.005% by weight (10 to 50 p.p.m.). In areas containing appreciable amounts of scale deposits, the build-up of additional scale deposits therein is also inhibited or prevented by use of the phosphate ester at a concentration of about 0.001 to 0.005%.

Amounts of phosphate ester below about 0.0005% are generally ineffective because at such low concentrations scale inhibition is not readily attained. Higher concentrations (above about 0.01%) do not provide improved scale protection.

It has been found to be desirable to use the phosphate ester in an alkaline aqueous medium to prevent corrosive attack of the treating equipment by the phosphate ester. In addition, the use of an alkaline medium with the phosphate ester appears to provide better inhibtion against scale buildup.

If the phosphate ester is used rather than the alkali or ammonium salt thereof, one can use the produced formation water at the well site which is generally alkaline, or the formation water can be readily treated with an alkaline material to obtain the required alkaline pH range of from about 7.1 to about 8 thereto. For example, a neutral or slightly acidic formation water can be made alkaline by the addition thereto of a minor amount of an inorganic alkaline reagent thereto, such as sodium or potassium hydroxide or ammonium hydroxide thereto.

The treating composition can be prepared as an additive admixture of the phosphate ester and the alkalinity reagent with the admixture being incorporated in the aqueous system to provide protection. One may also add the components (phosphate ester and inorganic alkalinity reagent) separately to the aqueous system.

It has been found that the degree of scale prevention protection provided by the phosphate ester and alkaline reagent can be enhanced by employing the composition in an aqueous solution that is maintained at a temperature between about 100° F. and 200° F., preferably between 105° and 175° F. Such temperatures can be readily attained by the use of auxiliary heaters and the like as will be readily apparent to those skilled in the art. In treating oil well tubing and the strata surrounding a bore hole that is at an elevated temperature, one may raise the temperature of the scale prevention composition to the desired elevated temperature by briefly holding the solution in the bore hole until the selected operating temperature is attained.

A more complete understanding of the invention will be obtained from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A preweighed metal rotor attached to an externally provided mechanical stirring device was immersed in the test solution for a twenty hour time period. The solution was maintained at a temperature of 104° F. during the test period. At the end of the 24 hours, the rotor was removed from the solution and from the stirrer, dried and reweighed. The difference in weight of the rotor is taken as the amount of calcium sulfate scale deposit build-up expressed in grams of scale. In all, 5 tests were conducted on each material being evaluated and the average of the 5 tests was taken as the amount of scale deposit. The above laboratory test procedure affords good correlation between the results thereby obtained and larger scale pilot evaluations of scale preventing compositions.

The following table records the results of the tests.

TABLE

| Example | Additive | Average weight of scale (grams) after 24 hrs. at 40° C. (104° F.)—amount of additive (p.p.m.) | | | | |
|---|---|---|---|---|---|---|
| | | 0 | 10 | 20 | 50 | 100 |
| Control | | 1.538 | | | | |
| 1 | "T" | | | 0 | 0.004 | |
| 2 | TSPP [1] | | | | 0.079 | |
| 3 | SHP [2] | | | | 1.470 | |
| 4 | "U" | | | | 0.690 | |
| 5 | "Y" | | | | 1.202 | |
| 6 | "Z" | | | | [3] 0.951 | |
| 7 | "W" | | | | 1.548 | |

[1] Tetrasodium pyrophosphate.
[2] Sodium hypophosphite.
[3] 18 hours.

In the above table Additive T is a mixture of esters of polyphosphonic acids containing polyethoxy linkages partially esterified with alkoxypolyethoxyethanols. Such mixed esters on typical analysis analyzed 51.9% carbon, 9.7% hydrogen, 8.8% phosphorous and 29.6% oxygen (by difference). The apparent empirical formula is $C_{42}H_{95}P_3O_{18}$ and the mixture has a calculated molecular weight of 965. The neutralization number was found to be 253. NMR analysis showed the mixture to comprise highly branched alkylated ethoxylated acid phosphate containing a 5:1 ratio of ortho and pyrophosphates. The ratio of ethylene oxide radical ($-CH_2-CH_2-O-$), tridecyl radical ($C_{13}H_{27}-$), and phosphate ester radical

are 3:1:1, respectively.

Compounds U, W, Y, and Z are commercial preparations sold under various trade names as scale inhibiting compositions.

Inspection of the data in the table reveals that the composition of the present invention is markedly superior to the commercial scale control compositions in effectiveness as well as to the inorganic phosphate compounds used in Examples 2 and 3.

The composition of the present invention has been successfully field tested in a number of wells in a producing area having a history of calcium sulfate scale deposition problems with good results. The composition was employed at a concentration of about 20 p.p.m. in water and was introduced into the prewet well tubing by means of a pump, circulated therethrough and the well shut in for a period of about 24 hours. Periodic treatments several times a week have been effective in preventing the build-up scale deposits in a treated well.

The phosphate ester of the present invention can be made up as a concentrate with a compatible alkalinity agent in an aqueous or an aqueous-glycol or an aqueous-alkanol medium. The aqueous glycol medium is preferred as there appears to be some additive effect resulting from the use of this particular medium in combination with the phosphate ester and caustic as the alkalinity agent.

Suitable ranges for the various components of the concentrate composition are on a weight basis from about 10 to about 25% of the phosphate ester, from about 1 to 3.5% of the compatible alkalinity agent (sodium hydroxide or equivalent), 0 to 40% glycol or alkanol, the balance water.

Representative glycols that may be used include ethylene glycol and propylene glycol. Representative alkanols include methanol, ethanol, propanol and isopropanol.

The particularly preferred compositions of the present invention comprise about 19.11% of the phosphate ester 4.98% of 50% caustic and 75.91% of water, on a weight basis, and with the glycol the preferred concentrate comprises 13.75% of the phosphate ester, 28.06% of ethylene glycol, 3.58% of 50% caustic and 54.61% of water, on a weight basis.

Obviously, many modifications and variations of the invention as hereinbefore set forth may be made without departing from the spirit and scope thereof and therefore only such limitations should be made as are indicated in the appended claims.

I claim:

1. A method of controlling the build-up of scale deposits in an aqueous system which comprises incorporating in said system a scale treating composition consisting essentially of an ester of polyphosphoric acid containing polyethoxy linkages partially esterified with alkoxypolyethoxyethanols and mixtures of said esters, the ester having the general formula

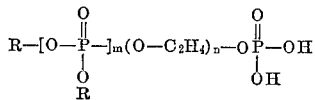

wherein R is either hydrogen or a $C_{13}H_{27}O-(C_2H_4O)_{n-1}-C_2H_4$ group in which $n$ is 1 to 3, $m$ is equal to 2 or 3 and R is a hydrogen atom not more than $m$ minus one times, said ester having a molecular weight in the range of from about 750 to about 1730, said treating composition being employed in an amount sufficient to inhibit the development of scale in an aqueous system.

2. Method as claimed in claim 1 wherein said ester has the formula

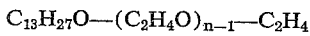

3. Method as claimed in claim 1 wherein said ester has the formula

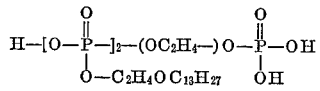

4. Method as claimed in claim 1 wherein said ester comprises a mixture of about 30 to 70% by weight of the phosphate ester of claim 2 and 70 to 30% by weight of the phosphate ester of claim 3.

5. Method as claimed in claim 1 wherein said phosphate ester is present in said system in an amount of from about 0.0005 to 0.01% by weight.

6. Method as claimed in claim 1 wherein said phosphate ester is present in said system in an amount of from about 0.001 to 0.005% by weight.

7. Method as claimed in claim 1 wherein said ester is present in the form of the sodium salt.

8. A scale inhibiting composition consisting essentially of an alkaline aqueous solution of an ester of polyphosphoric acid containing polyethoxy linkages partially esterified with alkoxypolyethoxyethanols and mixtures of said esters, the ester having the general formula

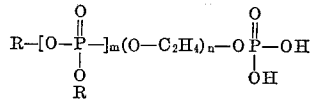

wherein R is either hydrogen or a $C_{13}H_{27}O-(C_2H_4O)-C_2H_4$ group in which $n$ is 1 to 3, $m$ is equal to 2 or 3 and R is a hydrogen atom not more than $m$ minus one times, said ester having a molecular weight in the range of from about 750 to about 1730, said treating composition being used at a concentration between 0.0005 and 0.01 percent by weight, and an inorganic alkaline reagent which is present in said aqueous solution in an amount sufficient to provide a pH range of from about 7.1 to about 8 thereto.

9. A scale inhibiting composition as claimed in claim 8 comprising from about 30 to about 70% by weight of the phosphate ester of claim 2 and from about 70 to 30% by weight of the phosphate ester of claim 3.

10. A scale inhibiting composition as claimed in claim 8 comprising on a weight basis from about 10 to about 25% of said phosphate ester or mixture of said esters, from about 1 to about 3.5% of a compatible alkalinity agent, 0 to 40% of a lower alkylene glycol, the balance water.

11. A scale inhibiting composition as claimed in claim 8 comprising on a weight basis from about 10 to about 25% of said phosphate ester or mixture of esters, from about 1 to about 3.5% of a compatible alkalinity agent, 0 to 40% of a lower alkanol, the balance water.

References Cited

UNITED STATES PATENTS

| | | | |
|---|---|---|---|
| 2,777,818 | 1/1957 | Gambill | 252—8.55 |
| 3,091,589 | 5/1963 | Brukner | 260—950 |
| 3,336,221 | 8/1967 | Ralston | 252—8.55 |

LEON D. ROSDOL, *Primary Examiner.*

W. SCHULZ, *Assistant Examiner.*

U.S. Cl. X.R.

252—8.55; 210—58; 260—928, 929

UNITED STATES PATENT OFFICE
CERTIFICATE OF CORRECTION

Patent No. 3,429,824　　　　　　　　　　　　February 25, 1969

Jack F. Tate

It is certified that error appears in the above identified patent and that said Letters Patent are hereby corrected as shown below:

Column 4, line 70, after "build-up" insert -- of --.

Signed and sealed this 28th day of April 1970.

(SEAL)
Attest:

Edward M. Fletcher, Jr.　　　　　　　　　WILLIAM E. SCHUYLER, JR.
Attesting Officer　　　　　　　　　　　　　　Commissioner of Patents